(12) United States Patent
Moore (10) Patent No.: US 9,141,622 B1
(45) Date of Patent: *Sep. 22, 2015

(54) FEATURE WEIGHT TRAINING TECHNIQUES

(75) Inventor: Robert Carter Moore, Mercer Island, WA (US)

(73) Assignee: Google Inc., Mountain View, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 13/234,967

(22) Filed: Sep. 16, 2011

(51) Int. Cl.
*G06F 15/18* (2006.01)
*G06F 17/30* (2006.01)

(52) U.S. Cl.
CPC .................. *G06F 17/3007* (2013.01)

(58) Field of Classification Search
CPC ....................................................... G06F 17/18
USPC ............................................................. 706/12
See application file for complete search history.

(56) References Cited

U.S. PATENT DOCUMENTS

| | | | |
|---|---|---|---|
| 6,687,696 B2 | 2/2004 | Hofmann et al. | |
| 7,328,216 B2 | 2/2008 | Hofmann et al. | |
| 7,587,391 B1 | 9/2009 | Bostock et al. | |
| 2008/0147579 A1* | 6/2008 | Gao ................................. | 706/25 |
| 2009/0055139 A1 | 2/2009 | Agarwal et al. | |
| 2009/0083126 A1 | 3/2009 | Koren et al. | |
| 2009/0099986 A1 | 4/2009 | Varma et al. | |
| 2010/0100416 A1 | 4/2010 | Herbrich et al. | |
| 2010/0179081 A1 | 7/2010 | Bernisson | |
| 2010/0198900 A1 | 8/2010 | Gifford | |
| 2011/0035379 A1 | 2/2011 | Chen et al. | |
| 2011/0184806 A1 | 7/2011 | Chen et al. | |
| 2011/0231348 A1 | 9/2011 | Xiao | |

OTHER PUBLICATIONS

Chang et al. (Coordinate descent method for large-scale L2-loss linear support vector machines, J. Machine Learning Research 9: 1369-1398 (2008).*
Yuan et al. (A comparison of optimization methods and software for large-scale L1-regularized linear classification, J. Machine Learning Research 11:3183-3234 (2010).*
Adam Berger, Stephen Della Pietra, and Vincent Della Pietra. 1996. A maximum entropy approach to natural language processing. Computational Linguistics, 22(1)39-71.
Michael Collins. 2002. Discriminative training methods for hidden Markov models: theory and experiments with perceptron algorithms. In Proceedings of the Conference on Empirical Methods in Natural Language Processing, Jul. 6-7, Philadelphia, Pennsylvania, USA, 1-8.

(Continued)

*Primary Examiner* — Ben Rifkin
*Assistant Examiner* — Michael Zidanic
(74) *Attorney, Agent, or Firm* — Remarck Law Group PLC (57) ABSTRACT

Techniques of creating a classifier model for a multi-class linear classifier are disclosed. The classifier model includes feature weights for each of a plurality of feature and label combinations. One technique includes selecting an update set of feature weights to be updated from the classifier model, determining an update for each of the feature weights in the selected update set using a processor, a plurality of the updated determined independently of all other updates and determined based on a largest reduction in an output of a loss function, modifying each of the updates using a step size, and updating the classifier model feature weights using the modified, determined updates.

20 Claims, 6 Drawing Sheets

(56) References Cited

OTHER PUBLICATIONS

Koby Crammer and Yoram Singer. 2001. On the algorithmic implementation of multiclass kernel-based vector machines. Journal of Machine Learning Research, 2:265-292.

John Duchi and Yoram Singer. 2009. Efficient online and batch learning using forward-backward splitting. Journal of Machine Learning Research, 10:2899-2934.

Tedd Dunning. 1993. Accurate methods for the statistics of surprise and coincidence. Computational Linguistics, 19 (1):61-74.

Thorsten Joachims. 2006. Training linear SVMs in linear time. In KDD '06, Proceedings of the 12th ACM SIGKDD International Conference on Knowledge Discovery and Data Mining, Aug. 20-23, Philadelphia, Pennsylvania, USA.

Thorsten Joachims, Thomas Finley, and Chun-Nam John Yu. 2009. Cutting-plane training of structural SVMs. Journal of Machine Learning, 77(1):27-59.

Percy Liang, Hal Daume III, and Dan Klein. 2008. Structure compilation: trading structure for features. In Proceedings of the 24th International Conference on Machine Learning, Jul. 5-9, Helsinki, Finland, 592-599.

Mitchell P. Marcus, Beatrice Santorini, and Mary A. Marcinkiewicz. 1993. Building a large annotated corpus of English: The Penn Treebank. Computational Linguistics, 19(2):313-330.

Andrew McCallum. 2003. Efficiently inducing features of conditional random fields. In Proceedings of the Nineteenth Annual Conference on Uncertainty in Artificial Intelligence, Aug. 7-10, Acapulco, Mexico, 403-441.

Franz Josef Och. 2003. Minimum error rate training in statistical machine translation. In Proceedings of the 41st Annual Meeting of the Association for Computational Linguistics, Jul. 7-12, Sapporo, Japan, 160-167.

Simon Perkins, Kevin Lacker, and James Theiler. 2003. Grafting: fast, incremental feature selection by gradient descent in function space. Journal of Machine Learning Research, 3:1333-1356.

Adwait Ratnaparkhi. 1996. A maximum entropy model for part-of-speech tagging. In Proceedings of the Conference on Empirical Methods in Natural Language Processing, May 17-18, Philadelphia, Pennsylvania, USA, 133-142.

Stefan Riezler and Alexander Vasserman. 2004. Incremental feature selection and l1 regularization for relaxed maximum-entropy modeling. In Proceedings of the Conference on Empirical Methods in Natural Language Processing, Jul. 25-26, Barcelona, Spain, 174-181.

Libin Shen, Giorgio Satta, and Aravind K. Joshi. 2007. Guided learning for bidirectional sequence classification. In Proceedings of the 45th Annual Meeting of the Association of Computational Linguistics, Jun. 23-30, Prague, Czech Republic, 760-767.

Kristina Toutanova, Dan Klein, Christopher D. Manning, and Yoram Singer. 2003. Feature-rich part-of-speech-tagging with a cyclic dependency network. In Proceedings of the 2003 Human Language Technology Conference of the North American Chapter of the Association for Computational Linguistics, May 27-Jun. 1, Edmonton, Alberta, Canada, 173-180.

Arriaga, R. and Vempala, S. An algorithmic theory of learning: Robust concepts and random projection. FOCS, 1999.

Aslam, J., and Decatur, S. Specification and simulation of statistical query algorithms for efficiency and noise tolerance. Journal of Computer and System Sciences, 56:191-208, 1998.

Auer, P. and Cesa-Bianchi, N. On-line learning with malicious noise and the closure algorithm. Annals of Mathematics and Artificial Intelligence, 23:83-99, 1998.

Block, H. The Perceptron: a model for brain functioning. Reviews of Modern Physics, 34:123-135, 1962.

Blum, A. Random Projection, Margins, Kernels, and Feature-Selection. In LNCS vol. 3940, pp. 52-68, 2006.

Blum, A. and Balcan, M.-F. A discriminative model for semi-supervised learning. JACM, 57(3), 2010.

Blumer, A., Ehrenfeucht, A, Haussler, D. and Warmuth, M. Learnability and the Vapnik-Chervonenkis dimension. Journal of the ACM, 36(4):929-965, 1989.

Bradley, J. K. and Schapire, R. E. Filterboost: Regression and classification on large datasets. In NIPS, 2007.

Bshouty, N.H., Goldman, S.A. and Mathias, H.D. Noise-tolerant parallel learning of geometric concepts. Information and Computation, 147(1):89-110, 1998.

Collins, M., Schapire, Robert E. and Singer, Y. Logistic regression, adaboost and bregman distances. Machine Learning, 48(1-3):253-285, 2002.

Decatur, S. Statistical queries and faulty PAC oracles. In Proc. 6th COLT, pp. 262-268, 1993.

DIMACS 2011 Workshop. Parallelism: A 2020 Vision, 2011.

Domingo, C. and Watanabe, O. MadaBoost: a modified version of AdaBoost. In COLT, 2000.

Feldman, V., Gopalan, P., Khot, S., and Ponnuswami, A. On agnostic learning of parities, monomials, and halfspaces. Siam J. Comput., 39(2):606-645, 2009.

Feller, W. Generalization of a probability limit theorem of Cramer. Trans. Am. Math. Soc., 54:361-372, 1943.

Fischer et al. "An Asynchronous Parallel Newton Method", Mathematical Programming 42 (1988) 363-374.

Freund, Y. An adaptive version of the boost-by-majority algorithm. Machine Learning, 43(3):293-318, 2001.

Freund, Y. Boosting a weak learning algorithm by majority. Information and Computation, 121(2):256-285, 1995.

Freund, Y. and Schapire, R. A short introduction to boosting. J. Japan. Soc. Artif. Intel., 14 (5):771-780, 1999.

Freund, Y. and Schapire, R. Large margin classification using the Perceptron algorithm. In Proc. 11th COLT, pp. 209-217., 1998.

Gavinsky, D. Optimally-smooth adaptive boosting and application to agnostic learning. JMLR, 4:101-117, 2003.

Gentile, C. and Littlestone, N. The robustness of the p-norm algorithms. In Proc. 12th COLT, pp. 1-11, 1999.

Greenlaw, R., Hoover, H.J. and Ruzzo, W.L. Limits to Parallel Computation: P-Completeness Theory. Oxford University Press, New York, 1995.

Guruswami, V. and Raghavendra, P. Hardness of learning halfspaces with noise. SIAM J. Comput., 39(2):742-765, 2009.

Kalai, A. and Servedio, R. Boosting in the presence of noise. Journal of Computer & System Sciences, 71 (3):266-290, 2005.

Karmarkar, N. A new polynomial time algorithm for linear programming. Combinatorica, 4:373-395, 1984.

Kearns, M. and Li, M. Learning in the presence of malicious errors. SIAM Journal on Computing, 22(4):807-837, 1993.

Kearns, M. and Mansour, Y. On the boosting ability of top-down decision tree learning algorithms. In STOC, 1996.

Kearns, M. and Vazirani, U. An Introduction to Computational Learning Theory. MIT Press, 1994.

Khardon, R. and Wachman, G. Noise tolerant variants of the perceptron algorithm. JMLR, 8:227-248, 2007.

Klivans, A., Long, P. and Servedio, R. Learning Halfspaces with Malicious Noise. JMLR, 10:2715-2740, 2009.

Long, P. and Servedio, R. Martingale boosting. In Proc. 18th Annual Conference on Learning Theory (COLT), pp. 79-94, 2005.

Long, P. and Servedio, R. Random classification noise defeats all convex potential boosters. Machine Learning, 78 (3):287-304, 2010.

Mansour, Y. and McAllester, D. Boosting using branching programs. Journal of Computer & System Sciences, 64 (1):103-112, 2002.

Mansour, Y. and Parnas, M. On Learning Conjunctions with Malicious Noise, Computer Science Department, Tel-Aviv University, Date Unknown, 6 pp.

NIPS 2009 Workshop. Large-Scale Machine Learning: Parallelism and Massive Datasets, 2009.

Reif, John H. O(log2 n) time efficient parallel factorization of dense, sparse separable, and banded matrices. SPAA, 1994.

Renegar, J. A polynomial-time algorithm, based on Newton's method, for linear programming. Mathematical Programming, 40:59-93, 1988.

Rosenblatt, F. The Perceptron: a probabilistic model for information storage and organization in the brain. Psychological Review, 65:386-407, 1958.

(56) References Cited

OTHER PUBLICATIONS

Sargin, Mehmet Emre, and Aradhye, Hrishikesh, Boosting Video Classification Using Cross-Video Signals, IEEE 2011, pp. 1805-1808, Google Inc.

Schapire, R. The strength of weak learnability. Machine Learning, 5(2):197-227, 1990.

Schapire, Robert E., The Boosting Approach to Machine Learning an Overview, MSRI Workshop on Nonlinear Estimation and Classification, 2002 (23 pp).

Servedio, R. Smooth boosting and learning with malicious noise. Journal of Machine Learning Research. 4:633-648, 2003.

Shawe-Taylor, J., Bartlett, P., Williamson, R. and Anthony, M. Structural risk minimization over data-dependent hierarchies. IEEE Transactions on Information Theory, 44(5):1926-1940, 1998.

Tsochantaridis et al. ("Large Margin Methods for Structured and Interdependent Output Variables"), Journal of Machine Learning Research 6 (2005) 1453-1484.

Valiant, L. A theory of the learnable. Communications of the ACM, 27(11):1134-1142, 1984.

Valiant, L., Learning Disjunctions of Conjunctions. In Proc. 9th IJCAI, pp. 560-566, 1985.

Vapnik, V. Statistical Learning Theory. Wiley-Interscience, New York, 1998.

Vitter, J.S. and Lin, J. Learning in parallel. Inf. Comput., 96(2):179-202, 1992.

Weston et al. "Feature Selection for SVMs", 2004, pp. 19 http://www.ee.columbia.edu/~sfchang/course/svia-F04/slides/feature_selection_forSVMs.pdf.

\* cited by examiner

FEATURE WEIGHT TRAINING TECHNIQUES

TECHNICAL FIELD

The present invention relates in general to machine learning and multi-label classification.

BACKGROUND

Machine learning, a type of artificial intelligence, includes the study of computing devices that are able to recognize patterns in data. One way to enable a computing device to recognize patterns in data (and assign labels to tokens of data) is to train the computing device using a training set of data, commonly called a training corpus. The computing device can then analyze the training set of data to create a classifier model usable to analyze other data sets.

A commonly used training set of data for machine learning is the Penn Treebank II corpus. This corpus includes news articles that are annotated with tags (labels) indicating the parts of speech (POS) of the words within the corpus. The labels provide the computing device with "correct answers" for the training set of data that permits the generation of a classifier model during a training process.

SUMMARY

Disclosed herein are embodiments of techniques for feature weight training.

One aspect of the disclosed embodiments is a technique of creating a classifier model for a multi-class linear classifier, the classifier model including feature weights for each of a plurality of feature and label combinations. The technique includes iteratively performing the steps of: selecting a number of feature weights from the classifier model to update for inclusion in an update set, the selection performed without respect to feature weights selected in any previous iteration, and, in a plurality of iterations, the number of feature weights being greater than in a previous iteration, determining an update for each of the feature weights included in the update set based on a line-search of a loss function l that incorporates a multi-class $L_1$-regularized hinge loss function that is continuous and piece-wise linear, the line-search performed using the following steps for each of those feature weights: identifying, for each of the selected feature weights, points representative of values u resulting in a change in slope of an unregularized loss output function $l_{(f,l_u)}(u)$ or a regularization penalty output function $r_{(f,l_u)}(u)$, the output functions each derived from the loss function l, determining at least one derivative value for an initial point of the output functions and at least one change in derivative value for at least some of the points using a processor, determining a cumulative reduction in loss for at least some of the points using at least one of the determined derivative values or at least one of the changes in derivative values, and determining the update based on a point having a largest cumulative reduction in loss. The technique further includes determining a step size to modify a magnitude of each of the updates, creating an updated classifier model using the step size and the updates, and stopping the iteration if the updated classifier model or a recently updated classifier model is determined to be sufficiently accurate.

Another aspect of the disclosed embodiments is a technique of creating a classifier model for a multi-class linear classifier, the classifier model including feature weights for each of a plurality of feature and label combinations. The technique includes selecting an update set of feature weights to be updated from the classifier model, determining an update for each of the feature weights in the selected update set using a processor, a plurality of the updates determined independently of all other updates and determined based on a largest reduction in an output of a loss function, modifying each of the updates using a step size, and updating the classifier model feature weights using the modified, determined updates.

Another aspect of the disclosed embodiments is a technique of training a classifier model for use in a multi-class linear classifier, the classifier model including a plurality of feature weights, the feature weights each representative of one of a plurality of feature and label combinations. The technique includes iteratively performing the steps of determining an update for each feature weight in a set of feature weights selected from the plurality of feature weights in the classifier model using a processor, a plurality of the updates determined independently of all other updates and determined based on a largest reduction in an output of a loss function, determining a step size to modify the determined updates, and updating the classifier model using the determined updates and step size.

Another aspect of the disclosed embodiments is a computing scheme for feature weight training. The computing scheme includes one or more computing devices each having at least one memory and at least one processor, the computing devices configured to execute instructions stored in at least one memory to iteratively determine an update for each feature weight in a set of feature weights selected from the plurality of feature weights in the classifier model using a processor, a plurality of the updates determined independently of all other updates and determined based on a largest reduction in an output of a loss function, determine a step size to modify the determined updates, and update the classifier model using the determined updates and step size.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

A classifier model is created using feature weight training. In the disclosed subject matter, the classifier model is created using an iterative process. The iterative process includes selecting an update set of feature weights from the classifier model to be updated for a given iteration. The update set is selected independently of previous iterations (meaning that previously included feature weights may not be included in later update sets). An update is independently determined for each of the feature weights in the update set. A step size is determined based on the determined updates, and the classifier model is updated by adding the updates multiplied by the step size. This iterative process continues until a stopping condition is reached, at which point the most accurate updated classifier model found is produced as output.

Figure 1:
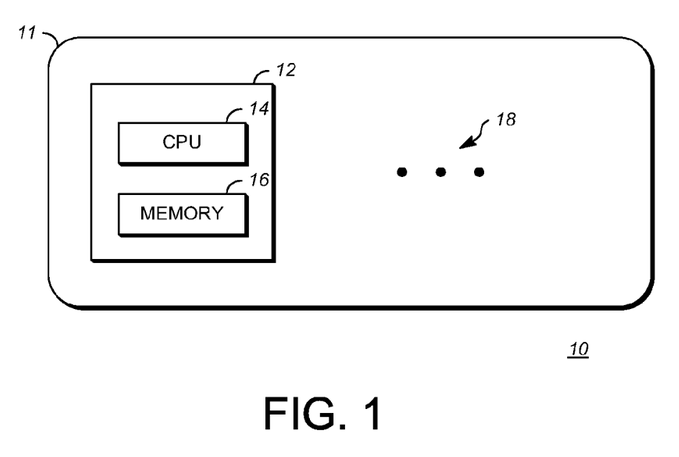
FIG. 1 is a diagram of a computing scheme according to embodiments of the disclosed subject matter.

FIG. 1 is a diagram of a computing scheme 10 according to embodiments of the disclosed subject matter. An exemplary computing device 12 can be, for example, a computer having an internal configuration of hardware including a processor such as a central processing unit (CPU) 14 and a memory 16. CPU 14 can be a controller for controlling the operations of computing device 12. The CPU 14 is connected to memory 16 by, for example, a memory bus. Memory 16 can include random access memory (RAM) or any other suitable memory device. Memory 16 can store data and program instructions which are used by the CPU 14. Other suitable implementations of computing device 12 are possible.

The computing device 12 can be the only computing device or can be one of a group of computing devices 17 that includes additional computing devices 18. The group of computing devices 17 can be implemented as a computing cluster whereby the computing device 12 and additional computing devices 18 share resources, such as storage memory, and load-balance the processing of requests to the computing device. The group of computing devices 17 can alternatively be a cloud computing service. For example, a cloud computing service can include hundreds or thousands of computing devices configured to provide scalable computing resources. In a cloud computing service, computing tasks can be performed on one or more computing devices or other computing devices included within the cloud computing service.

The above are only exemplary implementations of the group of computing devices 17, and any distributed computing model can be used in their place. As used herein, the term computing device is understood to include any combination or implementation of computing devices, computing device groups, or any other configuration of computing devices.

Other implementations of the computing scheme 10 are possible. For example, one implementation can omit the group of computing devices 17 and additional computing devices 18 and include only a single computing device 12.

In one example of machine learning, a classification problem can be defined using a label universe $\mathcal{L}$ and a feature universe $\mathcal{F}$. A classification problem is solved using a classifier. The label universe $\mathcal{L}$ contains all labels that can be assigned by the classifier. Each token (piece of data) processed by the classifier is assigned at least one label by the classifier based on at least one feature associated with that piece of data. In the implementation described herein, labels include parts of speech (POS). For example, POS can include words (tokens) that are nouns, verbs, and adjectives. However, in alternative implementations, any universe of labels $\mathcal{L}$ can be utilized (for example, labels indicating a category of a news article). Tokens can be, for example, one word. Alternatively, tokens can be created based on any portion of a dataset.

Feature universe $\mathcal{F}$ contains all features that can be used by the classifier. Features are intrinsic to the data, meaning that they are objectively determinable by the classifier for each token extracted from a dataset. For example, some features in feature universe $\mathcal{F}$ can include: Contains a digit, Contains a hyphen, Contains an upper-case character, Lower-cased frequency class, Original-case frequency class, Lower-cased prefixes up to 4 characters, Lower-cased suffixes up to 4 characters, Lower-cased token, and Original-case token. The above features can be evaluated for each of the previous, current, and next tokens. Additional features can include whether the current token follows or precedes a sentence boundary. Each token has an associated feature set f that contains the features from feature universe $\mathcal{F}$ applicable to that token, such that $f \subseteq \mathcal{F}$.

The features described above are indicator features, meaning that they are binary in nature. For the above features, an example/token either has the feature (in which case, the value of the feature can be 1) or it does not (in which case, the value of the feature can be 0). However, features can include features having other integer or floating point values. For example, in a classifier intended to classify new stories by topic, a token might be an entire news story, and an integer-valued feature might be the number of times a particular word occurs in the new story. While the exemplary implementations are described with respect to the use of binary features, other integer and floating point valued features can also be utilized with the processes described herein.

A classifier model w is defined as a vector $w \in \mathfrak{R}^{|\mathcal{L}| \times |\mathcal{F}|}$. Classifier model w includes feature weight coordinates $w_{(f,l)}$ for at least some feature f and at least some label l. The value of each feature weight coordinate is, for example, a floating point number indicative of whether the existence of feature f provides evidence that label l is the best label for a token. The classifier model w is used to predict a label l of a token by summing together, for each label, the feature weights corresponding to the set f of features associated with the token and selecting the label l having the maximum summed value as defined in formula 1:

$$l(f, w) = \operatorname*{argmax}_{l \in L} \sum_{f \in f} w_{(f,l)} \qquad (1)$$

Figure 2:
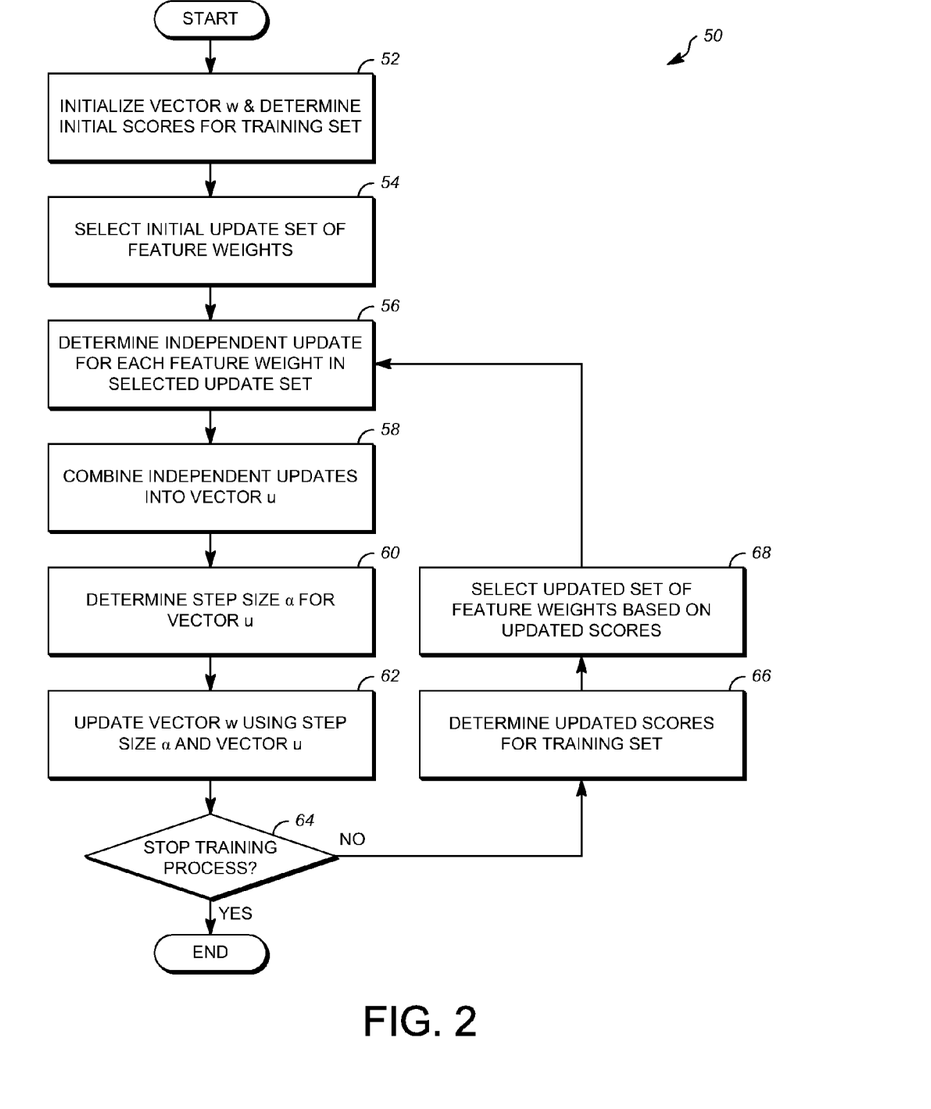
FIG. 2 is a flowchart of a technique for feature weight training according to embodiments of the disclosed subject matter.

FIG. 2 is a flowchart of a technique 50 for feature weight training according to embodiments of the disclosed subject matter. Feature weight training is the process of determining or generating classifier model w. The technique 50 can be referred to as Simultaneous MERT (SiMERT). SiMERT is in part related to Minimum Error Rate Training (MERT), a process for optimizing low-dimensional classifier models. SiMERT provides, in one use-case, the ability to scale for use in a high-dimensional classifier including, for example, hundreds of thousands of features. Technique 50 can be more efficient than conventional techniques, particularly when a large number of feature weights are considered. Conventional techniques can include, for example, sequential co-ordinate descent or Powell's Method, where only one feature weight update is computed per iteration. Also, technique 50 can be utilized with non-convex loss functions, unlike some conventional techniques that can only be utilized with convex loss functions (i.e. those used to process large numbers of feature weights).

In general, feature weight training includes the process of taking a training set T that includes annotations of "correct" labels for each token and using the training set T to generate the classifier model w. A goal of feature weight training is to produce a classifier model w that accurately identifies the labels of tokens in data other than the training set (i.e. without the use of annotations). For testing purposes, a set of common test data can be used to quantitatively measure the accuracy of classifier model w (i.e. identify a percentage of labels accurately identified).

Starting at stage 52, technique 50 includes initializing classifier model (vector) w and calculating initial scores for vector w using training set T. Vector w can be initialized to include all zero feature weights. Correspondingly, the initial scores will all be zero, since all of the weights are zero. However, in an alternative implementation, vector w can be initialized to at least some non-zero values. At stage 54, an initial update set U⊆w of feature weights is selected. The initial update set U of feature weights indicates which feature weights will be updated with new values in the first iteration of the training process.

Limiting the update set U to a subset of w can provide the benefit of producing a sparser model w. In other words, sparse means that a significant number of feature weights $w_{(f,l)}$ are zero. If the model w is initialized to zero for all feature weights, then the number of feature weights that become non-zero is proportional to the number of feature weights that can be updated in the iterative updates to w, especially in the first few updates.

One technique for selecting the initial update set U includes using a log-likelihood-ratio (LLR) association metric. In this technique, an LLR score is calculated for each feature-value pair (f,l) found in the training set T. The feature-value pairs are ordered by their scores, and a certain number are selected to include their associated feature weights in update set U in order from the highest score. The certain number can be pre-determined or be otherwise chosen or determined by technique 50. The feature weights included in update set U can be restricted to those that have a negative hinge-loss derivative. An alternative technique for selecting the initial update set includes using a hinge-loss derivative instead of the LLR.

Once the update set U is selected, an update u is determined independently for each feature-value pair (f,l) included in U at stage 56. The update u is determined based on a loss function l. Loss function l can be any function of a set of feature weights such that a decrease in the output value of the function generally indicates an increase in the quality of the predictions made by a model using those feature weights. Loss functions can include, for example, $L_1$-regularized hinge loss, $L_2$-regularized hinge loss, or a simple error count with respect to a training set. Update u can be calculated as a value u' that minimizes the output of loss function l using formula 2:

$$u_{(f,l)} = \operatorname*{argmin}_{u'} l(w + u' b_{(f,l)}); \text{ wherein} \quad (2)$$

b is a vector of the same dimension as w, wherein b has a value of 1 at coordinate (f,l) and a value of 0 at all other coordinates.

Formula 2 can be computed using, for example, a line-search technique. Once an update u is determined for each feature-value pair (f,l) included in U, the updates u are combined into an update vector u at stage 58. The combination can be performed using formula 3:

$$u = \sum_{f,l} u_{(f,l)} b_{(f,l)} \quad (3)$$

After update vector u is created from updates u, a step size α is determined for weighting the update vector u at stage 60.

The combination of updates u will generally result in an "overshooting" of the targeted minimized loss (resulting in a higher loss than targeted). This is because feature weights are interdependent (i.e. the selection of a label is the result of summing together multiple feature weights) and the updates u are each selected independently from each other. As such, step size α is selected to weight the updates u as a group in an effort to prevent overshooting the targeted minimized loss. Step size α is generally a value between 0 and 1. The step size α can often be between the values of 0.1 and 0.25, although α is typically 0.5 on the first iteration of the training process. The determination of step size α as a value α' that minimizes loss function l can be expressed mathematically as shown in formula 4.

$$\alpha = \operatorname*{argmin}_{\alpha' > 0} l(w + \alpha' u) \quad (4)$$

The step size α can be determined using line-search techniques. Once the step size α is determined, at stage 62, feature weights in vector w are updated using the step size α and update vector u. The updated vector w' replaces vector w for subsequent stages in technique 50. Updated vector w' can be determined using formula 5:

$$w' = w + \alpha u \quad (5)$$

At stage 64, technique 50 determines whether to stop the training process or to continue iterating to further update vector w. Various techniques can be used to identify when the training process should be terminated. One technique includes testing the classifier model w produced by each iteration of the training process. The testing can include the use of a held-out data set. The held-out data set includes annotated tags ("correct" labels). The classifier model w is used to determine at least one label for each token in the held-out data set, and the determined labels are compared to the "correct" labels to determine the accuracy of classifier model w.

The technique of testing can be extended by storing a certain number of test results from past iterations in order to determine when the accuracy of classifier model w has been maximized. For example, the accuracy results from the past three or five iterations can be stored. However, any number of past accuracy results can be stored in alternative implementations. If, for an identified number of iterations, the accuracy does not improve, then the most accurate model found will be used. For example, if the identified number is three, once three iterations are completed without improvement, the most accurate model recently found (in this case, from four iterations ago) will be selected, and the technique 50 for training will complete.

Alternatively, other techniques for stopping the training technique 50 can also be used. For example, instead of using held-out data, the loss reduction on the training set between iterations can be measured and monitored. If the loss reduction falls below a threshold for a certain number of iterations, such as 1-5 iterations, then the stoppage of the training process can be triggered.

If the training process is not stopped at the current iteration, control passes to stage 66, where updated scores are determined for the current model w (same as w' from stage 62) using the training set T. The determined scores can include calculating the absolute value of the derivative of a loss function l.

At stage 68, an updated update set U of feature weights is determined based on the updated scores. In an exemplary implementation, updated update set U is determined for each iteration of the training technique 50. The inclusion of a feature weight in update set U in a previous iteration does not guarantee its inclusion in update set U in later iterations. This contrasts with previous machine learning techniques, which simply add to previously selected update sets. Also, the number of feature weights included in update set U is typically increased for each iteration of technique 50. For example, an initial update set U can contain 1,000 feature weights, while subsequent iterations can each include an additional 1,000 feature weights.

However, in some implementations and situations, subsequent iterations will not include a greater number of feature weights in update set U. For example, in some iterations, there may be no additional feature weights that qualify for selection into update set U. In one exemplary situation, remaining feature weights may have a score of zero or other score beneath a selection threshold.

Starting with the highest score, feature weights are selected into update set U until the number of feature weights desired for update set U is reached, or no additional feature weights having a score greater than the selection threshold are available. In an exemplary implementation, the score is the absolute value of the derivative of a loss function and the selection threshold is 0. Once the updated update set U is determined, control returns to stage 56 for the next iteration of technique 50 using updated update set U and updated model w.

The steps of technique 50 represent only one implementation of technique 50, and various alternative implementations of technique 50 are available, including those that add, delete, and modify steps of technique 50. Some of the steps of technique 50 have been described without regard to exact technical implementation and may require additional steps to complete. For example, certain steps may utilize technique 150 and technique 180 as described later. However, alternative processes may be used instead of technique 150 and technique 180. The formulas herein describe a model for achieving the technique 50. However, implementations of technique 50 may not actually compute each of the formulas shown or may reduce in some way the computation of said formulas for convenience, computational complexity reduction, or various other reasons.

Figure 3:
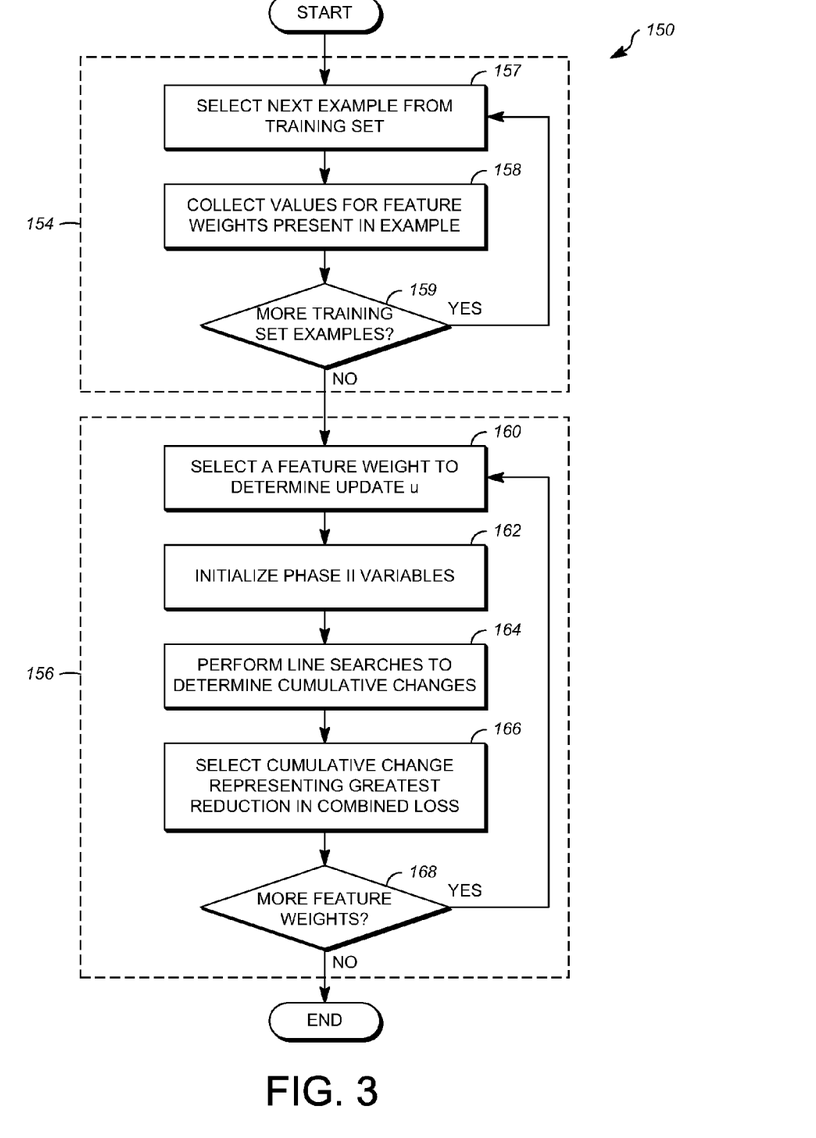
FIG. 3 is a flowchart of a technique for determining updates to feature weights in an update set to reduce loss associated with a classifier model within the technique of FIG. 2 according to embodiments of the disclosed subject matter.

FIG. 3 is a flowchart of a technique 150 for determining updates to feature weights in an update set to reduce loss associated with a classifier model within the technique 50 of FIG. 2 according to embodiments of the disclosed subject matter. Specifically, technique 150 can be utilized to determine independent updates within stage 56. Within technique 150, there are two phases, phase I 154 and phase II 156. In phase I 154, values are collected for the line searches of phase II 156 using the scores for each example in the training set. In phase II 156, the values collected in phase I 154 for each feature weight are used in line-searches to determine update u.

Technique 150 will be described using an $L_1$-regularized loss function l. However, technique 150 is not limited to use of this particular loss function l and may utilize alternative loss functions l. Loss function l will typically be continuous and piece-wise linear. The $L_1$-regularized loss function includes the use of multiclass hinge loss. Hinge loss is the amount by which a score of a correct label fails to exceed, by at least a margin of 1, the score of any other label. It is calculated by taking the larger of zero or one plus the difference between the largest sum of the feature weights of an incorrect label and the sum of the feature weights of the correct label. Hinge loss $hl(w; (f, l_h))$ of an example token from a training set T can be defined mathematically as shown in formula 6:

$$hl(w; (f, l_h)) = \max\left(0, 1 + \max_{l'_h \neq l_h} \sum_{f \in f} w_{(f, l'_h)} - \sum_{f \in f} w_{(f, l_h)}\right) \quad (6)$$

wherein
$l_h$ is the correct label of the example token; and
$l_h'$ ranges over the incorrect labels (i.e all labels in $\mathcal{L}$ except for $l_h$).

The $L_1$-regularized loss function l can be defined in terms of the hinge loss. The $L_1$-regularized loss function l includes a first term that is the unregularized loss value and a second term that is the regularization value. The unregularized loss value is determined using a sum of the hinge losses for each token (or subset of tokens) in training set T. The regularization value prevents the model w from overfitting the training set T. Overfitting occurs when the loss on the examples included in T is optimized to the point that there is a lower classification accuracy on other examples not included in T. The $L_1$-regularized loss function l is shown in formula 7:

$$l(w) = \sum_{(f, l_h) \in T} hl(w; (f, l_h)) + C \sum_{f \in F} \sum_{l_r \in L} |w_{(f, l_r)}| \quad (7)$$

wherein
C is a regularization constant that controls a balance between regularization and unregularized loss reduction Formula 7 can be used as a basis to identify an unregularized loss for an update u to a particular feature weight and a regularization value for the update u to the feature weight. The unregularized loss is determined using a sum of the hinge losses for each token (or subset of tokens) in training set T with respect to u. Since the hinge loss on a particular example is piecewise linear, the sum of hinge loss over a set of examples will also be piecewise linear. A function $l_{(f, l_u)}(u)$ for determining an unregularized loss for the update u can be projected from the $L_1$-regularized loss function l as shown in formula 8 and a function $r_{(f, l_u)}(u)$ for determining a regularization value for the update u can be projected from the $L_1$-regularized loss function l as shown in formula 9:

$$l_{(f, l_u)}(u) = \sum_{(f, l_u') \in T} hl(w + ub_{(f, l_u)}; (f, l_u')); \text{ wherein} \quad (8)$$

$l_u$ is the label of the feature weight to be updated by u;
$l_u'$ is the correct label for the example (f, $l_u'$);
b is a vector having a value of 1 at coordinate (f,$l_u$) and a value of 0 at all other coordinates.

$$r_{(f, l_u)}(u) = C|w_{(f, l_u)} + u| \quad (9)$$

Figure 4:
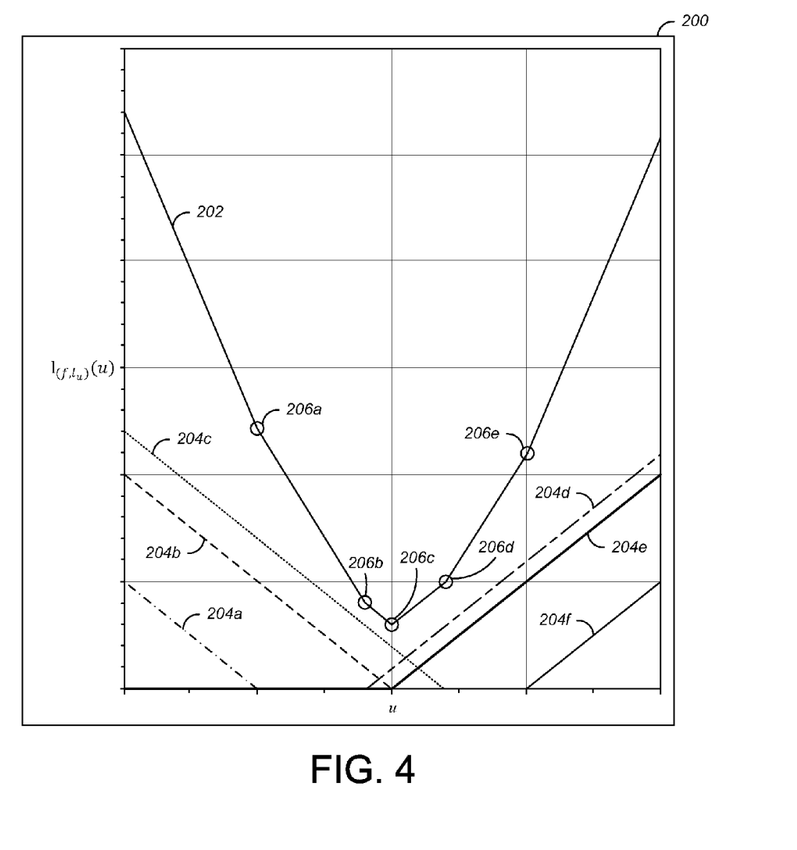
FIG. 4 is a graph illustrative of hinge loss values for individual training examples and for a sum of hinge losses over the training set with respect to a selected feature weight used within the technique of FIG. 3 according to embodiments of the disclosed subject matter.

FIG. 4 is a graph 200 illustrative of hinge loss values for individual training examples and for a sum of hinge losses over the training set with respect to a selected feature weight used within the technique 150 of FIG. 3 according to embodiments of the disclosed subject matter. Graph 200 includes a sum-of-losses plot 202 and individual-example hinge loss plots 204*a-f*. Update plot 202 corresponds to the output of formula 8. Hinge losses 204*a-f* correspond to hinge loss values within the summation of formula 8 for various tokens within the training set T (i.e. various examples of (f, $l_u'$)∈T). The graph 200 shows that some hinge losses can have a positive slope while others can have a negative slope. The slope of a hinge loss graph is positive if the selected feature weight is associated with an incorrect label for an example/token. Correspondingly, the slope is negative if the selected feature weight is associated with a correct label for an example/token. In other words, the direction in which the hinge loss increases for a particular feature weight associated with a particular label is correlated with whether that label is the correct label for the example/token in training set T for which the hinge loss is measured.

When summed together, the hinge loss plots 204a-f become plot 202, which, in this example, is continuous piecewise linear and mathematically convex. Plot 202 includes vertices 206a-e that each correspond with at least one vertex present in the hinge loss plots 204a-f. Vertices 206a-e are the data points on which the steps of technique 150 (and similarly, technique 180) operates.

Referring back to FIG. 3, in phase I 154, values are collected for the line searches using the scores for each example in the training set. Referring to phase I 154 conceptually, the following sets of values are collected for each feature weight $w_{(f,l_u)}$ in the update set. The values $dl_{(f,l_u)}(0)$ as the derivative $$\frac{dl_{(f,l_u)}(u)}{du}$$

of $l_{(f,l_u)}(u)$ at an initial point where u=0 and $dr_{(f,l_u)}(0)$ as the derivative $$\frac{dr_{(f,l_u)}(u)}{du}$$

of $r_{(f,l_u)}(u)$ at an initial point where u=0 can be collected. There need not be a change in the derivative at the initial point. However, values relating to the regularization value r can be collected during stage 162 or stage 164 of phase II 156 to improve efficiency. $dl_{(f,l_u)}(0)$ includes a forward $d_{(f,l_u)}^+(0)$ derivative measurement, used when searching values of u>0 (i.e. a forward line search), and a backwards $dl_{(f,l_u)}^-(0)$ derivative measurement, used when searching values of u<0 (i.e. a backward line search). Similarly, $dr_{(f,l_u)}(0)$ includes a forward $dr_{(f,l_u)}^+(0)$ derivative measurement and a backwards $dr_{(f,l_u)}^-(0)$ derivative measurement. Each is used for one direction of line searching in phase II 156. At an inflection point of a continuous piecewise linear function, the forward and backward derivative measurements for the function will have different values. When the term "derivative" is used with respect to a continuous piecewise linear function at such a point, it refers to either the forward or backward derivative measurement for the function at that point depending on whether the reference occurs within the context of a forward search or a backward search.

For each value $u_i$ at which there is a vertex (inflection) point in the loss function, $\Delta dl_{(f,l_u)}(u_i)$ is determined and collected as the change in $$\frac{dl_{(f,l_u)}(u)}{du}$$

at $u_i$. Further, $\Delta dr_{(f,l_u)}(u_i)$ is determined and collected as the change in $$\frac{dr_{(f,l_u)}(u)}{du}$$

at an additional point $u_j = -w_{(f,l_u)}$.

In one implementation, at stage 157, an example is selected from the training set T. At stage 158, values are collected for the feature weights present in the selected example. At stage 159, if there are additional training set examples available, control returns to stage 157 to select the next available example. Otherwise, the collection of values is complete, and control passes to the first stage of phase II 156 (stage 160).

While the values collected for a particular feature weight can be determined using a number of techniques, the following is a technique that can be used by some implementations, such as within stages 157-159 above. The collected values can be determined based on training examples/tokens in training set T. The updates made for each training example/token are based on difference $\Delta_s$. Difference $\Delta_s$ is the difference between the score for the correct label of the example/token and the highest score of the incorrect labels.

For a given training example/token and possible label, we define a relevant feature weight to be a feature weight contained in the current update set that corresponds to the label combined with a feature that is exemplified by the example/token. In stage 158, if $\Delta_s = 1$, then (1) $dl_{(f,l_u)}^-(0)$ is decremented by 1 for the relevant feature weights corresponding to the correct label for the selected example/token; and (2) $dl_{(f,l_u)}^+(0)$ is incremented by 1 for relevant feature weights corresponding to the highest-scoring incorrect labels for the selected example/token.

Otherwise, if $\Delta_s < 1$, then (1) both $dl_{(f,l_u)}^+(0)$ and $dl_{(f,l_u)}^-(0)$ are decremented by 1 for the relevant feature weights corresponding to the correct label for the selected example/token; (2) $dl_{(f,l_u)}^+(0)$ is incremented by 1 for the relevant feature weights corresponding to the highest-scoring incorrect labels for the selected example/token; and (3) $dl_{(f,l_u)}^-(0)$ is incremented by 1 for the relevant feature weights corresponding to the highest-scoring incorrect label for the selected example/token, if no other incorrect label has the same score.

Increments to instances of $\Delta dl_{(f,l_u)}(u_i)$ can be determined by a simple criterion. In stage 158, for feature weights $w_{(f,l_u)}$ in the update set, $\Delta dl_{(f,l_u)}(u_i)$ increases by 1 if an update of $u_i$ to feature weight $w_{(f,l_u)}$ changes the minimum difference on the selected training example between the score for the correct label and the score for any incorrect label, such that minimum difference becomes exactly 1. Since each update affects only a single label, the relevant updates can be found simply by looking at differences in scores for pairs of labels.

Accumulating the updates for all instances of $\Delta dl_{(f,l_u)}(u_i)$ can be the most memory intensive aspect of SiMERT. To reduce memory requirements, the updates $u_i$ can be quantized at values of 1, −1, and multiplicative increments and decrements of 1.1. That is, every update is represented by an element of the sequence ( . . . , $1.1^{-2}$, $1.1^{-1}$, $1.1^1$, $1.1^2$, . . . ) or the sequence ( . . . , $-(1.1^{-2})$, $-(1.1^{-2})$, −1, $-(1.1^1)$, $-(1.1^2)$, . . . ). Due to this quantization, the feature weights can be limited to no more than a few hundred distinct quantized update values on any iteration, including feature weights with more than 100,000 training data occurrences.

While $$\frac{dr_{(f,l_u)}(u)}{du}$$

at u=0 for a particular feature weight can be determined using a number of techniques, the following is a technique that can be used by some implementations, such as within stages 162 or 164 below or 157-159 above. As mentioned previously, values related to regularization value r can be collected during phase II 156 in some implementations to improve efficiency.

$$\frac{dr_{(f,l_u)}(u)}{du}$$

at u=0 includes a forward $dr_{(f,l_u)}^+(0)$ and a backwards $dr_{(f,l_u)}^-(0)$ derivative measurement. For a feature weight in the update set having a current value $w_0$, the derivative values can be determined by (1) if $w_0>0$, then $dr_{(f,l_u)}^+(0)$ and $dr_{(f,l_u)}^-(0)$ are each set to C (the regularization constant); (2) if $w_0=0$, then $dr_{(f,l_u)}^+(0)$ is set to C and $dr_{(f,l_u)}^-(0)$ is set to −C; and (3) if $w_0<0$, then $dr_{(f,l_u)}^+(0)$ and $dr_{(f,l_u)}^-(0)$ are each set to −C. $\Delta dr_{(f,l_u)}(u)$ is defined only for $u=-w_0$ such that $\Delta dr_{(f,l_u)}(-w_0)$ is set to 2C.

The values collected in phase I 154 are used in the line searches of phase II 156. For phase II 156, at stage 160, a feature weight is selected for which an update u will be determined. For each selected feature weight, two line searches are performed, one through the positive values of $u_i$ collected for the feature weight and one through the negative values of $u_i$ collected for the feature weight. At stage 162, phase II variables are initialized with respect to each line search for the selected feature weight. The variables include initial cumulative reduction in loss $\Delta_{l,0}$ and variables dl and dr, which track $$\frac{dl_{(f,l_u)}(u)}{du}$$

and $$\frac{dr_{(f,l_u)}(u)}{du}$$

for each value of $u_i$.

For both search directions, initial cumulative reduction in loss change $\Delta_{l,0}$ is set to zero. For the positive (forward) search direction, dl is set to $dl_{(f,l_u)}^+(0)$ from phase I 154, and dr is set to $dr_{(f,l_u)}^+(0)$ from phase I 154. For the negative (backward) search direction, dl is set to $dl_{(f,l_u)}^-(0)$ from phase I 154, and dr is set to $dr_{(f,l_u)}^-(0)$ from phase I 154. Next, at stage 164, technique 150 iterates through the collected data points $u_i$, in order, for each of the forwards and backwards line searches to determine the cumulative reduction for each point. Points $u_i$ that have a value of $\Delta dl(u_i)$ and $\Delta dr(u_i)$ each equal to zero can be bypassed in the iteration. The cumulative reduction in loss for each data point $u_i(\Delta_{l,i})$ is set using formula 10:

$$\Delta_{l,i}=\Delta_{l,i-1}-(dl+dr)(u_i-u_{i-1}) \tag{10}$$

In addition, dl and dr can also be updated during the iterations of stage 164. If, at a given point $u_i$, $$\frac{dl_{(f,l_u)}(u)}{du}$$

changes, dl is updated by adding $\Delta dl_{(f,l_u)}(u)$ (collected from phase I 154) to dl. Also, if, at a given point $u_i$, $$\frac{dr_{(f,l_u)}(u)}{du}$$

changes, dr is updated by adding $\Delta dr_{(f,l_u)}(u_i)$ (collected from phase I 154) to dr. The updated values of dl and dr will be used for the next iteration of stage 164. If $l_{(f,l_u)}(u)$ and $r_{(f,l_u)}(u)$ are known to be convex functions, then phase II 156 can be configured to terminate early when $\Delta_{l,i}$ is not greater than $\Delta_{l,i-1}$.

Lastly, at stage 166, a value $u_i$ is selected and returned based on a value of i that corresponds to a largest value of cumulative loss reduction $\Delta_{l,i}$. The largest value of cumulative loss reduction $\Delta_{l,i}$ can be a maximum cumulative loss reduction or an approximation thereof. Correspondingly, the value $u_i$ can correspond to a minimum value (or an approximation thereof) of the loss function l for any possible value of $u_i$. The value $u_i$ is the value $u_{(f,l)}$ as shown in formula 2. Finally, at stage 168, technique 150 determines whether there are additional feature weights to be processed. If so, control returns to stage 160. Otherwise, technique 150 ends.

The above describes only one implementation of a technique 150 for determining various updates u for feature weights of model w. Various alternative and modified implementations can also be utilized. For example, certain steps of the process may be performed taking into account all selected feature weights at a time, such as when measurements and calculations are performed during the line searches. The formulas above represent a technique for identifying an update for multiple feature weights within a single iterative process. It is anticipated that variations and modifications of the above formulas and techniques will be made to accommodate various implementations. Also, other types of line searches can be used for loss functions that are not piecewise continuous linear. For example, a MERT line search can be used if the loss function is an error count.

Figure 5:
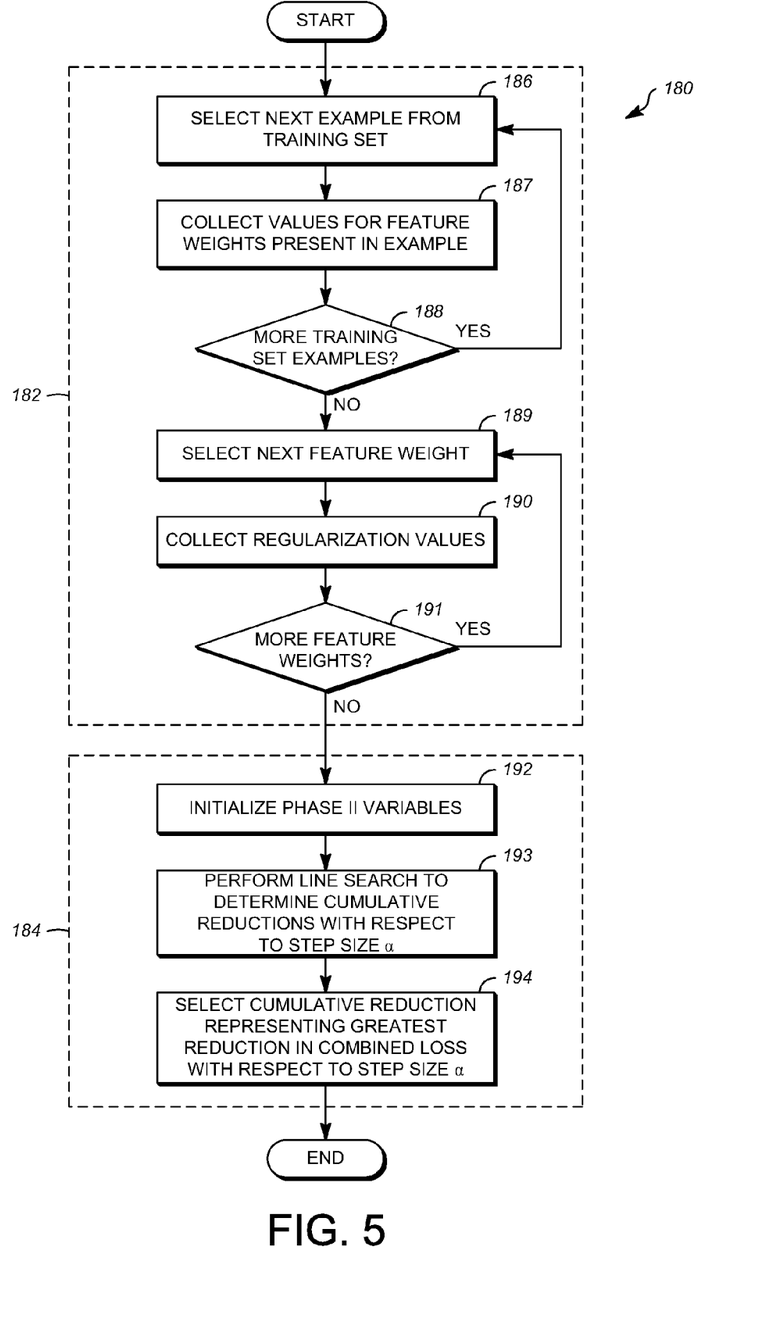
FIG. 5 is a flowchart of a technique for determining a step size for an update vector to reduce the overall loss of the updates in the update vector within the technique of FIG. 2 according to embodiments of the disclosed subject matter.

FIG. 5 is a flowchart of a technique 180 for determining a step size α for an update vector u to reduce the overall loss of the updates in the update vector within the technique 50 of FIG. 2 according to embodiments of the disclosed subject matter. Similar to formulas 8-9, a function l(α) for determining an unregularized loss for a step size α can be projected from the $L_1$-regularized loss function l as shown in formula 11 and a function r(α) for determining a regularization value for a step size α can be projected from the $L_1$-regularized loss function l as shown in formula 12:

$$l(\alpha) = \sum_{(f,l_r)\in T} hl(w+\alpha u; (f,l_r)) \tag{11}$$

$$r(\alpha) = C\sum_{f\in F}\sum_{l_r \in L} |w_{(f,l_r)} + \alpha u_{(f,l_r)}| \tag{12}$$

Similar to technique 150, technique 180 includes two phases, phase I 182 and phase II 184. During phase I 182, values are collected, including dl and dr, and for various values of $\alpha_i$, also $\Delta dl(\alpha_i)$ and $\Delta dr(\alpha_i)$. Phase II 184 includes a line search to find a sufficiently accurate value for step size α. With respect to phase I 182, starting at stage 186 an example is selected from the training set. At stage 187, unregularized loss values associated with the selected example are collected. Then, at stage 188, if there are additional examples available for selection from training set T, control returns to stage 186 to select the next example. Otherwise, regularization values are collected. First, a feature weight is selected from the update set at stage 189. Regularization values are collected with respect to the feature weight at stage 190. Then at stage 191, if there are additional feature weights available for selection, control returns to stage 189 to select the next feature weight. Otherwise, collection of values is complete and control passes to phase II 184 by way of stage 192.

The stages of phase I 182 can be implemented in various different ways, and one potential implementation is disclosed here. Collection and computation of the above values is simplified by subtracting 1 (the minimum desired margin) from the score of the correct label for each training example. This allows for the hinge loss for each example to be treated as merely the difference between the highest score of any label and the score for the correct label. For an example having $(f, l_s)$ (wherein $l_s$ is the correct label), the score $s(l_s')$ of any label $l_s'$ with respect to the example can be defined using formula 13:

$$s(l_s') = \left(\sum_{f \in f} w_{(f,l_s')}\right) - \delta(l_s', l_s); \text{ wherein} \qquad (13)$$

$\delta(l_s', l_s)$ is equal to 1 if $l_s' = l_s$ and 0 otherwise.

Given formula 13, hinge loss can be redefined as shown in formula 14 and, assuming the use of formula 14, the derivatives of the score and the hinge loss can be defined as shown in formulas 15-16:

$$hl(w; (f, l_s)) = \max_{l_s'} s(l_s') - s(l_s) \qquad (14)$$

$$\frac{ds_{l_s'}(\alpha)}{d\alpha} = \sum_{f \in f} u_{(f,l_s')} \qquad (15)$$

$$\frac{dl(\alpha)}{d\alpha}(\alpha_i) = \frac{ds_{l_s'}(\alpha)}{d\alpha} - \frac{ds_{l_s}(\alpha)}{d\alpha}; \text{ wherein} \qquad (16)$$

$l_s'$ is the highest scoring label at $\alpha_i$ and $l_s$ is the correct label.

Based on the above defined formulas 13-16, values of dl(0) (the derivative at an initial point where $\alpha=0$) and $\Delta dl(\alpha_i)$ can be determined. First, for each training example, the values of $\alpha > 0$ at which the highest scoring label changes are determined using, for example, a MERT line search based on the scores $s(l_s')$. These values are arranged in order to define a sequence $\alpha_1, \ldots, \alpha_k$. Also defined is a sequence of highest scoring labels $l_0, \ldots, l_k$, such that $\alpha_i$ is the point at which the highest scoring label changes from $l_{i-1}$ to $l_i$. For each training example, dl(0) is incremented by $$\frac{ds_{l_0}(\alpha)}{d\alpha} - \frac{ds_{l_s}(\alpha)}{d\alpha}$$

and $\Delta dl(\alpha_i)$ is incremented by $$\frac{ds_{l_i}(\alpha)}{d\alpha} - \frac{ds_{l_{i-1}}(\alpha)}{d\alpha}$$

for each value of i from 1 to k.

To determine the values of dr(0) and $\Delta dr(\alpha_i)$, for each feature weight in the update set having a value $w_0$ and a determined update $u_{(f,l)}$, the following steps are performed.

First, if $u_{(f,l)} > 0$ and $w_0 \geq 0$, dr(0) is incremented by $Cu_{(f,l)}$. Second, if $u_{(f,l)} > 0$ and $w_0 < 0$, dr(0) is decremented by $Cu_{(f,l)}$ and $\Delta dr(-w_0/u_{(f,l)})$ is incremented by $2Cu_{(f,l)}$. Third, if $u_{(f,l)} < 0$ and $w_0 > 0$, dr(0) is decremented by $-Cu_{(f,l)}$ and $\Delta dr(-w_0/u_{(f,l)})$ is incremented by $-2Cu_{(f,l)}$. Fourth, if $u_{(f,l)} < 0$ and $w_0 \leq 0$, dr(0) is incremented by $-Cu$ ).

At stage 192, variables for phase II 184 are initialized. Such variables can include initial cumulative loss reduction $\Delta_{l,0}$ and intermediate variables dl and dr, which track the derivatives of unregularized loss and regularization value, respectively, with respect to a for each value of $\alpha_i$.

Initial cumulative loss reduction $\alpha_{l,0}$ is set to zero, dl is set to dl(0) from phase I 182, and dr is set to dr(0) from phase I 182. Next, at stage 193, technique 180 iterates through the collected data points $\alpha_i$, in order, for the line search to determine the cumulative reduction for each point. Points $\alpha_i$ that have values of $\Delta dl(\alpha_i)$ and $\Delta dr(\alpha_i)$ each equal to zero can be bypassed in the iteration. The cumulative reduction for each data point $\alpha_i$ ($\Delta_{l,i}$) is set using formula 17:

$$\Delta_{l,i} = \Delta_{l,i-1} - (dl + dr)(\alpha_i - \alpha_{i-1}) \qquad (17)$$

In addition, dl and dr can also be updated during the iterations of stage 193. If, at a given point $\alpha_i$, $$\frac{dl(\alpha)}{d\alpha}$$

changes, dl is updated by adding $\Delta dl(\alpha_i)$ (collected from phase I 182) to dl. Also, if, at a given point $\alpha_i$, $$\frac{dr(\alpha)}{d\alpha}$$

changes, dr is updated by adding $\Delta dr(\alpha_i)$ (collected from phase I 182) to dr. The updated values of dl and dr will be used for the next iteration of stage 193. If $1_{(f,l_u)}(\alpha)$ and $r_{(f,l_u)}(\alpha)$ are known to be convex functions, then phase II 184 can be configured to terminate early when $\Delta_{l,i}$ is not greater than $\Delta_{l,i-1}$.

Lastly, at stage 194, an optimum step size value $\alpha_i$ is selected and returned based on a value of i that corresponds to a largest value of cumulative loss reduction $\Delta_{l,i}$. The largest value of cumulative loss reduction $\Delta_{l,i}$ can be a maximum cumulative loss reduction over possible step sizes or an approximation thereof. Correspondingly, the value $\alpha_i$ can correspond to a minimum value (or an approximation thereof) of the loss function l with respect to an update vector u for any value of $\alpha_i \geq 0$. The value $\alpha_i$ is the value $\alpha$ as shown in formulas 4 and 5.

Figure 6:
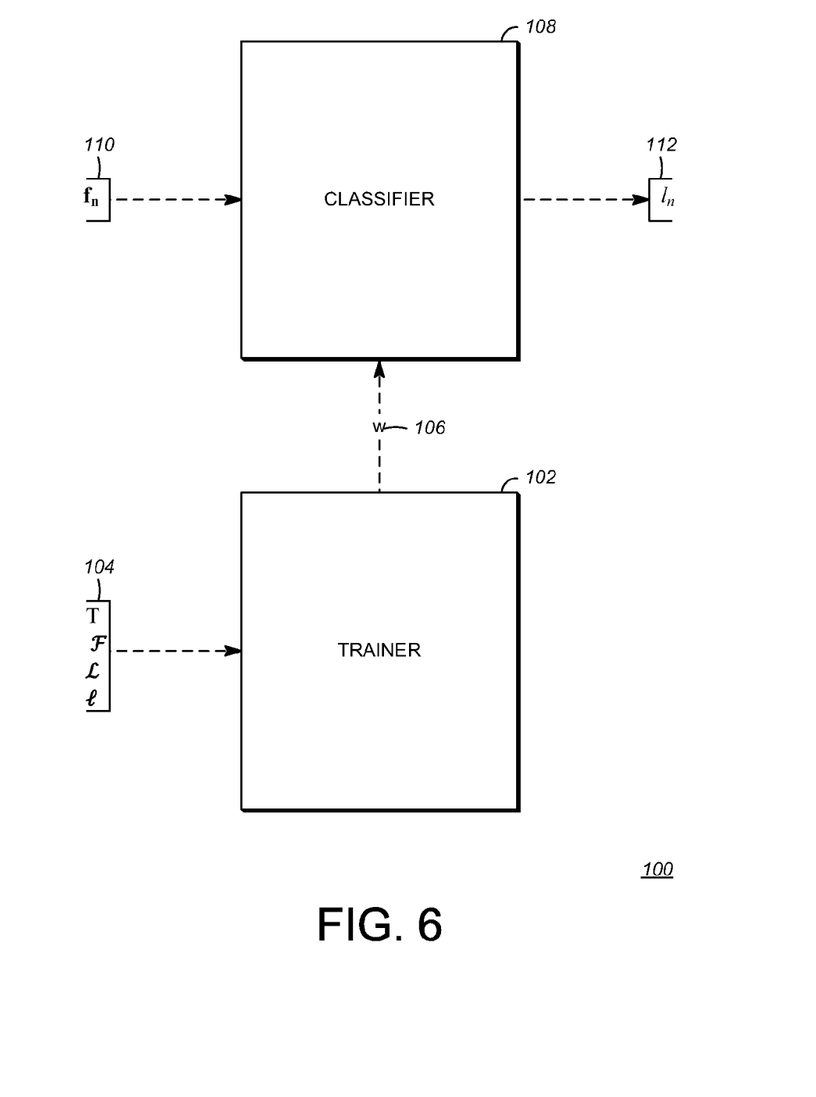
FIG. 6 is a block diagram of a training and classification scheme implemented in the computing scheme of FIG. 1 according to embodiments of the disclosed subject matter.

FIG. 6 is a block diagram of a training and classification scheme 100 implemented in the computing scheme 10 of FIG. 1 according to embodiments of the disclosed subject matter.

The scheme 100 includes a trainer 102 that is configured to accept input 104. Input 104 includes a training set T, feature universe $\mathcal{F}$, label universe $\mathcal{L}$ and a loss function l. Input 104 is used by trainer 102 to generate a classification model w 106. The generation can be performed, for example, using technique 50. The generated classification model w is output to classifier 108.

Classifier 108 is configured to accept input 110 that includes a feature set $f_n$ corresponding to a token n of a data set to be classified. Classifier 108 outputs $l_n$, a label for token n selected by classifier 108 based on the feature set $f_n$ and classification model w. The selection by classifier 108 can be performed, for example, by use of formula 1.

The trainer 102 and classifier 108 illustrate one possible implementation of scheme 100. Other implementations are available, including those that add, modify, and delete the inputs and outputs to and from trainer 102 and classifier 108.

The embodiments of computing device 12 and/or computing devices 17 (and the algorithms, techniques, instructions etc. stored thereon and/or executed thereby) can be realized in hardware including, for example, computers, IP cores, application-specific integrated circuits (ASICs), programmable logic arrays, optical processors, programmable logic controllers, microcode, firmware, microcontrollers, computing devices, microprocessors, digital signal processors or any other suitable circuit. As used herein, the term "processor" should be understood as encompassing any the foregoing, either singly or in combination. The terms "signal" and "data" are used interchangeably. Further, portions of computing device 12 and/or computing devices 17 do not necessarily have to be implemented in the same manner.

Further, in one example, computing device 12 and/or computing devices 17 can be implemented using a general purpose computer/processor with a computer program that, when executed, carries out any of the respective techniques, algorithms and/or instructions described herein. In addition or alternatively, for example, a special purpose computer/processor can be utilized which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The exemplary approaches herein have been described in order to allow easy understanding of the disclosed subject matter and do not limit the disclosed subject matter. On the contrary, the disclosed subject matter is intended to cover various modifications and equivalent arrangements included within the scope of the appended claims, which scope is to be accorded the broadest interpretation so as to encompass all such modifications and equivalent structure as is permitted under the law.

What is claimed is:

1. A method of creating a classifier model for a multi-class linear classifier, the classifier model including feature weights for each of a plurality of feature and label combinations, the method comprising iteratively performing the steps of:
   selecting a plurality of feature weights from the classifier model to update for inclusion in an update set, the selection performed without respect to feature weights selected in any previous iteration, and, in a plurality of iterations, the number of feature weights in the plurality of feature weights being greater than in a previous iteration;
   determining an update for each of the feature weights included in the update set based on a line-search of a loss function l that incorporates a multi-class $L_1$-regularized hinge loss function that is continuous and piece-wise linear, the line-search performed using the following steps for each of those feature weights:
   identifying, for each of the selected feature weights, points representative of values u resulting in a change in slope of an unregularized loss output function $l_{(f,l_u)}$ (u) or a regularization penalty output function $r_{(f,l_u)}$ (u), the output functions each derived from the loss function l,
   determining at least one derivative value for an initial point of the output functions and at least one change in derivative value for at least some of the points using a processor,
   determining a cumulative reduction in loss for at least some of the points using at least one of the determined derivative values or at least one of the changes in derivative values, and
   determining the update based on a point having a largest cumulative reduction in loss;
   combining the update for each of the feature weights into an update vector;
   determining a step size to modify a magnitude of each of the updates;
   modifying the update vector using the step size;
   creating an updated classifier model using the modified update vector; and
   stopping the iteration if the updated classifier model or a recently updated classifier model is determined to be sufficiently accurate.

2. A method of creating a classifier model for a multi-class linear classifier, the classifier model including feature weights for each of a plurality of feature and label combinations, the method comprising:
   selecting an update set of feature weights to be updated from the classifier model, the update set including a plurality of feature weights;
   determining an update for each of the feature weights in the selected update set using a processor, a plurality of the updates determined independently of all other updates, and determined based on a largest reduction in an output of a loss function;
   combining the update for each of the feature weights into an update vector;
   modifying the update vector using a step size; and
   updating the classifier model feature weights using the modified update vector.

3. The method of claim 2, wherein selecting an update set of feature weights to be updated from the classifier model, determining an update for each of the feature weights in the selected update set, modifying the update vector, and updating the classifier model feature weights are performed in a plurality of iterations to iteratively update the classifier model.

4. The method of claim 3, wherein the step size is the same for the update vector within an iteration of the plurality of iterations.

5. The method of claim 3, further comprising:
   initializing the classifier model.

6. The method of claim 5, wherein selecting an update set of feature weights in a first iteration of the plurality of iterations comprises:
   calculating a log-likelihood-ratio association metric (LLR score) for at least some feature-label pairs included in a training set; and
   selecting the update set as including an initial number of feature weights whose feature-label pairs have larger LLR scores than a plurality of feature weights that are not selected.

7. The method of claim 3, wherein selecting the update set of feature weights includes selecting the update set independently of update sets selected in previous iterations and, for at least some iterations, including an increased number of feature weights within successive iterations.

8. The method of claim 7, wherein selecting the update set of feature weights after a first iteration includes:
scoring the feature weights in the classifier model using a training set, the classifier model including updates from a last iteration; and
selecting feature weights into the update set based on at least one of: score magnitude, a score threshold, or a number of feature weights to be selected.

9. The method of claim 8, wherein the scoring is based on a derivative of a loss function.

10. The method of claim 3, wherein determining an update for each of the feature weights in the selected update set includes determining the update for each feature weight independently of other feature weight updates.

11. The method of claim 3, wherein determining an update for each of the feature weights in the selected update set includes determining an update u for a feature weight (f,l) using a derivation of the formula:

$$u_{(f,l)} = \underset{u'}{\mathrm{argmin}}\, l(w + u' b_{(f,l)}); \text{ wherein}$$

l is a loss function;
w is a classifier model; and
b is a vector having a value of 1 at coordinate (f,l) and a value of 0 at all other coordinates.

12. The method of claim 11, wherein modifying the update vector using the step size comprises:
determining a step size α using a line-search technique; and
multiplying the step size α by the update vector.

13. The method of claim 11, wherein determining the update u utilizes a line-search technique.

14. The method of claim 3, further comprising:
determining whether a stopping criterion is met at the end of each iteration, and if the stopping criterion is met, completing the iterative process and outputting a classifier model updated by the current or a previous iteration.

15. The method of claim 14, wherein the stopping criterion includes measuring an accuracy of the classifier model using held-out data, and determining whether the stopping criterion is met comprises:
retaining the accuracy measurements for at least some previous iterations;
comparing the accuracy measurements of the current iteration and previous iterations; and
determining that the stopping criterion is met if the accuracy measurements have not improved within a threshold number of iterations.

16. The method of claim 14, wherein the stopping criterion includes measuring a magnitude of updates, and determining whether the stopping criterion is met comprises:
determining that the stopping criterion is met if an update magnitude measurement drops below a update magnitude threshold.

17. A method of training a classifier model for use in a multi-class linear classifier, the classifier model including a plurality of feature weights, the feature weights each representative of one of a plurality of feature and label combinations, the method comprising:
iteratively performing the steps of:
determining an update for each feature weight in a set of feature weights selected from the plurality of feature weights in the classifier model using a processor, the set of feature weights including a plurality of feature weights, a plurality of the updates determined independently of all other updates and determined based on a largest reduction in an output of a loss function;
combininq the update for each of the feature weights into an update vector;
determining a step size to modify the update vector; and
updating the classifier model using the update vector.

18. The method of claim 17, wherein determining the updates comprises:
selecting the set of feature weights, the selection independent of the feature weights selected in any other iteration.

19. The method of claim 18, wherein selecting the set of feature weights during a first iteration includes:
calculating a log-likelihood-ratio association metric (LLR score) for at least some examples in a training set;
identifying a maximum number of feature weights to include in the set of feature weights; and
including feature weights into the set of feature weights in order of their LLR scores, the set of feature weights limited to include no more than the maximum number of feature weights, and any feature weights included having a non-zero loss function derivative.

20. The method of claim 17, wherein updating the classifier model includes updating each feature weight in the classifier having an associated update by adding the update for a current feature weight multiplied by the step size to the current feature weight.

* * * * *